(12) United States Patent
Agbaria

(10) Patent No.: US 9,165,048 B2
(45) Date of Patent: Oct. 20, 2015

(54) LINKED FIELD TABLE FOR DATABASES

(75) Inventor: Adnan Agbaria, Haifa (IL)

(73) Assignee: SAP SE, Walldorf (DE)

( * ) Notice: Subject to any disclaimer, the term of this patent is extended or adjusted under 35 U.S.C. 154(b) by 100 days.

(21) Appl. No.: 13/472,850

(22) Filed: May 16, 2012

(65) Prior Publication Data

US 2013/0311518 A1    Nov. 21, 2013

(51) Int. Cl.
*G06F 17/30* (2006.01)

(52) U.S. Cl.
CPC .... *G06F 17/30595* (2013.01); *G06F 17/30286* (2013.01); *G06F 17/30371* (2013.01); *G06F 17/30377* (2013.01); *G06F 17/30958* (2013.01)

(58) Field of Classification Search
CPC ............... G06F 17/30171; G06F 17/30274; G06F 17/30371; G06F 17/30377
USPC .......................................... 707/792, 800, 803
See application file for complete search history.

(56) References Cited

U.S. PATENT DOCUMENTS

| | | | |
|---|---|---|---|
| 5,561,793 A * | 10/1996 | Bennett et al. ................... | 1/1 |
| 5,615,367 A * | 3/1997 | Bennett et al. ................... | 1/1 |
| 6,112,209 A * | 8/2000 | Gusack ................... | 1/1 |
| 6,356,897 B1 * | 3/2002 | Gusack ................... | 1/1 |
| 6,581,063 B1 * | 6/2003 | Kirkman ................... | 1/1 |
| 6,629,102 B1 * | 9/2003 | Malloy et al. ................... | 1/1 |
| 6,795,425 B1 * | 9/2004 | Raith ................... | 370/345 |
| 7,433,879 B1 * | 10/2008 | Sharma et al. ................... | 1/1 |
| 7,725,471 B2 * | 5/2010 | Weinberg et al. ............ | 707/740 |
| 2004/0179720 A1 * | 9/2004 | Chen et al. ................... | 382/118 |
| 2007/0094286 A1 * | 4/2007 | Murthy et al. ............... | 707/101 |
| 2007/0130157 A1 * | 6/2007 | Jain et al. ................... | 707/10 |
| 2008/0104122 A1 * | 5/2008 | Hempleman et al. ...... | 707/104.1 |
| 2010/0306283 A1 * | 12/2010 | Johnson et al. ............... | 707/803 |

* cited by examiner

*Primary Examiner* — Hosain Alam
*Assistant Examiner* — Andalib Lodhi
(74) *Attorney, Agent, or Firm* — Buckley, Maschoff & Talwalkar LLC

(57) ABSTRACT

According to some embodiments, it may be determined that a first field in a first table is to be linked to a second field in a second table. A computer processor may then automatically create a new entry in a linked field table, the new entry including a linked field identifier, a source value, a source link referring to the second field in the second table, and a link counter containing a value indicating that one field refers to the second field in the second table. The first field in the first table may then be updated to refer to the new entry in the linked field table.

21 Claims, 9 Drawing Sheets

FIRST TABLE — 810

| ID | FIELD |
|---|---|
| ID_101 | ID_801 |
| ID_102 | ID_801 |
| ID_103 | DELETE |

— 800

LINKED FIELD TABLE — 850

| ID | SOURCE VALUE | SOURCE LINK | LINK COUNTER |
|---|---|---|---|
| ID_801 | SOURCE VALUE | 2ND TABLE, ID_202 | 2 |
| ID_802 | SOURCE VALUE | 2ND TABLE, ID_203 | 0 |

SECOND TABLE — 820

| ID | FIELD |
|---|---|
| ID_201 | |
| ID_202 | |
| ID_203 | SOURCE VALUE |

LINKED FIELD TABLE FOR DATABASES

FIELD

Some embodiments relate to systems and methods associated with electronic tables and/or databases. More specifically, some embodiments are directed to systems and methods using a linked field table to support tables and/or databases.

BACKGROUND

An enterprise may store information in fields of one or more tables or databases. For example, a table might include thousands of rows, with each row being associated with a different employee. Moreover, each row might be associated with a number of fields, or columns, each storing a value. For example, a field in a table might store a telephone number for the associated employee. In some cases, it may be appropriate for one or more fields to be "linked" to another field. For example, a first field might be linked to a second field, referred to as a "source" field, such that when the second field is subsequently updated (e.g., when an employee's telephone number is changed), that update will be automatically reflected in the first field.

Consider, for example, FIG. 1 which provides an illustration 100 of a way of linking fields in tables and/or databases. In particular, a first table 110 includes a linked entry ("ID_101") that refers to a particular source field in a second table 120 (associated with entry "ID_202"). FIG. 1 may be considered a basic or "naïve" implementation of linked fields that simply adds the identifier associated with the source value (including the name of the second table 120) in the value of linked field of the first table 110. Such an approach is similar to a typical memory reference.

Although the implementation illustrated in FIG. 1 is simple, note that each linked field in the first table 110 refers to the source field of the second table 120 using the table name, row identifier, and field name. Therefore, if any of these parameters change, the accurate reference to the source value may be lost. To avoid such a result, the system may need to examine all of the linked fields in the first table 110 and determine whether or not each field needs to be updated. Thus, the system may need to keep track of all the linked fields and associated source fields, which can impose significant overhead in many situations. Moreover, when there is a chain of links (e.g., the second table 120 points to yet another table not illustrated in FIG. 1), the system may need several Structured Query Language ("SQL") queries to access a single field.

FIG. 2 is an illustration 200 of another way of linking fields in tables. In this example, the system implements linked fields by creating a copy of the source value in a second table 220 at every linked field value in a first table 210. This approach may require the system to track all source fields associated linked fields for any update. As a result, a huge overhead may be imposed for every update of a source field in the second table 220 (although the complexity of fetching a value of a linked field may be limited).

Accordingly, methods and mechanisms to efficiently, accurately, and/or automatically support linked fields in tables and/or databases may be provided in accordance with some embodiments described herein.

DETAILED DESCRIPTION

An enterprise may store information in fields of one or more tables or databases. For example, a table might include thousands of rows, with each row being associated with a different customer of the enterprise. Moreover, each row might be associated with a number of fields, or columns, each storing a value, such as a name or mailing address for the associated customer. In some cases, it may be appropriate for one or more fields to be "linked" to another field. For example, a first field might be linked to a second field, referred to as a "source" field, such that when the second field is subsequently updated (e.g., when a customer's mailing address is changed), that update will be automatically reflected in the first field. Note that the basic ("naïve") implementation and/or the creation of copies of source values at every linked field value in a first table may be associated with a number of disadvantages, including substantial overhead problems—especially when a significant number of fields are involved.

Figure 1:
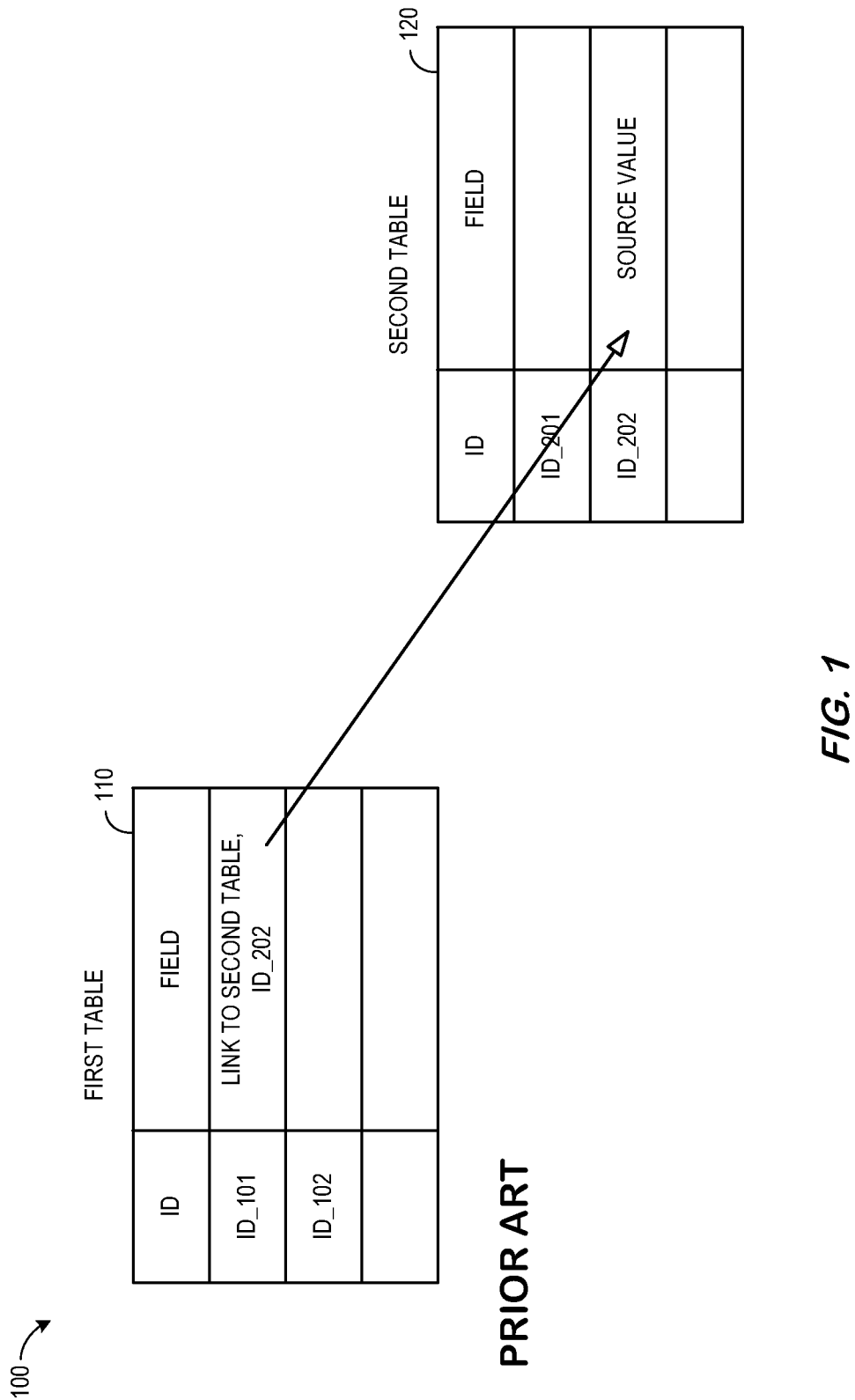
FIG. 1 illustrates a way of linking fields in tables and/or databases.
Figure 2:
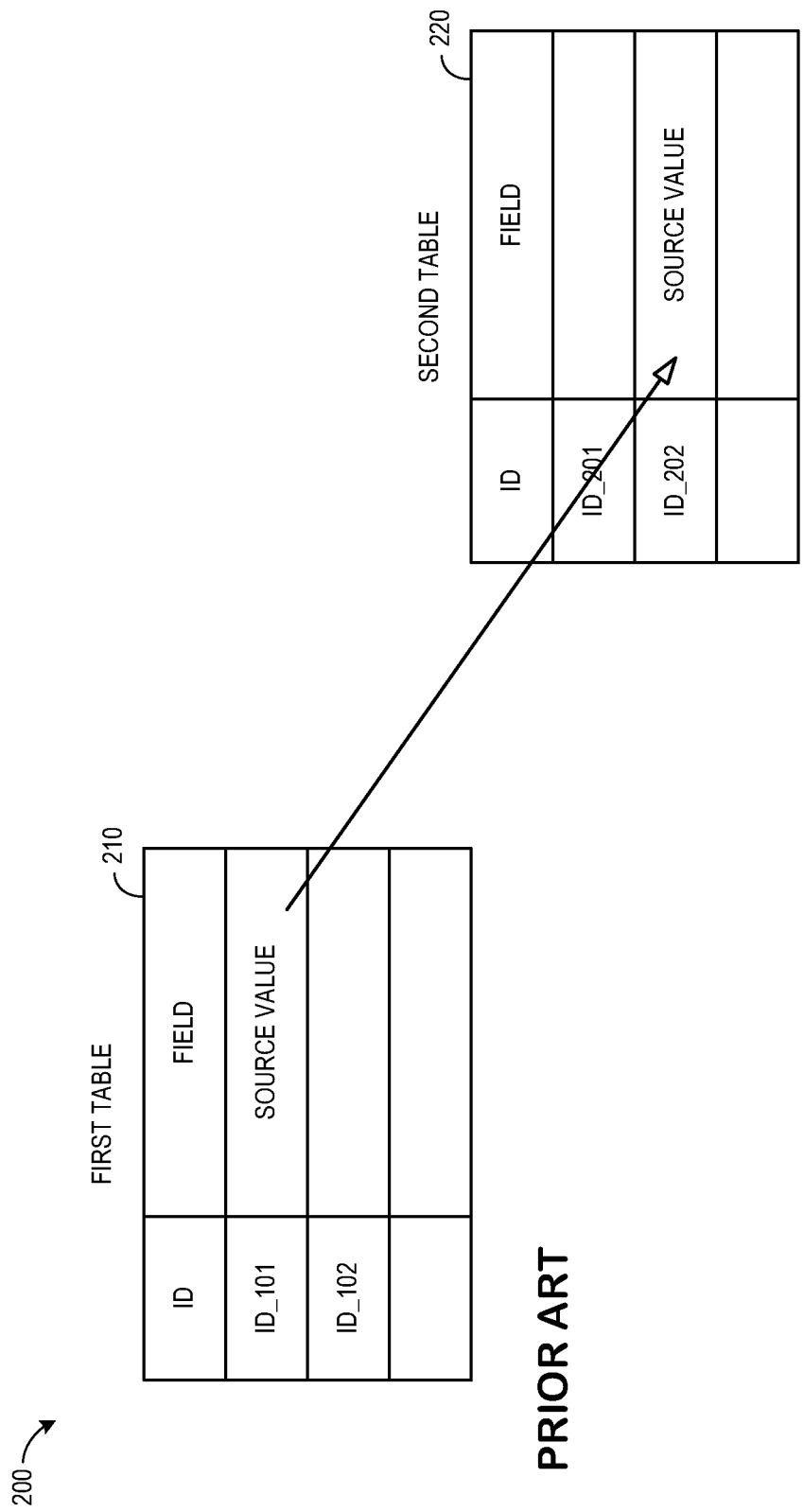
FIG. 2 illustrates another way of linking fields in tables.
Figure 3:
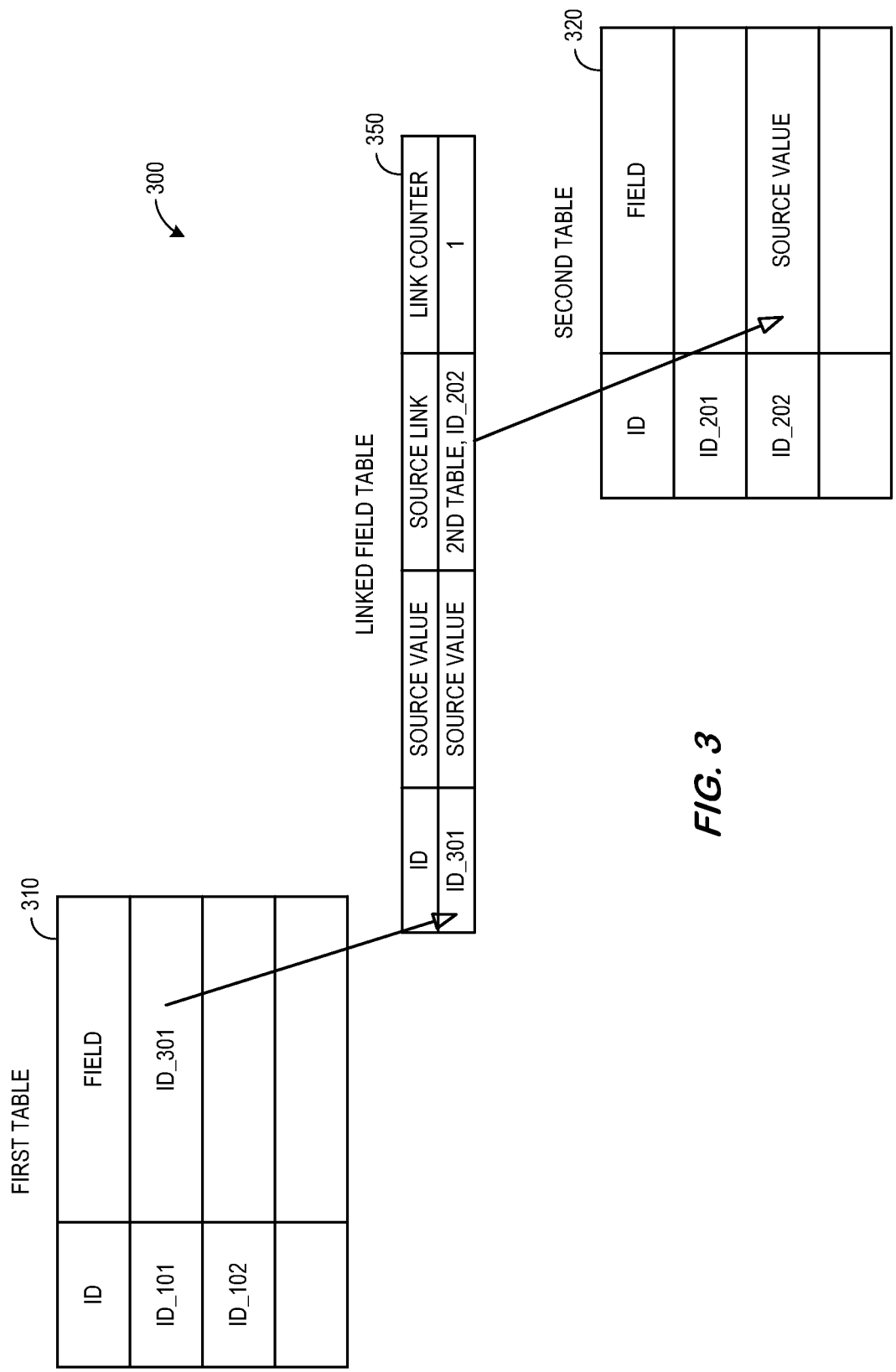
FIG. 3 illustrates a way of linking fields in tables in accordance with some embodiments.

FIG. 3 provides an illustration 300 of a way of linking fields in tables or databases in accordance with some embodiments. In particular, a field in a first table 310 is linked to a field in a second table 320 via a linked field table 350. The linked field table 350 might comprise, for example, a hash table that maintains control information for every source field in the second table 320 that has an associated link field in the first table 310.

For example, the linked field in the first table 310 may point to a row of the linked field table 350 (e.g., to the row of the linked field table 350 having an identifier of "ID_301"). According to some embodiments, for every data type in the system, the linked field table 350 includes:

- an identifier ("ID") representing a unique identifier for every row of the linked field table 350;
- a source value representing the value of the source field in the second table 320;
- a source link representing a link to the source value in the second table 320 (e.g., including a table name, field name, and/or row identifier of the source value in the second table 320); and
- a link counter representing how many link fields in the first table 310 refer to that particular source field.

By way of example only, the first table 310, the second table, and/or the linked field table 350 might be associated with an Enterprise Resource Planning (ERP) server, a business services gateway, a HyperText Transfer Protocol (HTTP) server, and/or an Advanced Business Application Programming (ABAP) server. Moreover, note that FIG. 3 represents one architecture for a system according to some embodiments, and actual implementations may include more or different components arranged in other manners. Moreover, each system described herein may be implemented by any number of devices in communication via any number of other public and/or private networks. Two or more of devices may be located remote from one another and may communicate with one another via any known manner of network(s) and/or a dedicated connection. Further, each device may comprise any number of hardware and/or software elements suitable to provide the functions described herein as well as any other functions. Other topologies may be used in conjunction with other embodiments.

Any of the elements illustrated in FIG. 3, including the first table 310, the second table, and/or the linked field table 350 may exchange information via any communication network which may be one or more of a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks.

All systems and processes discussed herein may be embodied in program code stored on one or more computer-readable media. Such media may include, for example, a floppy disk, a CD-ROM, a DVD-ROM, magnetic tape, OR solid state Random Access Memory (RAM) or Read Only Memory (ROM) storage units. Embodiments are therefore not limited to any specific combination of hardware and software.

Figure 4:
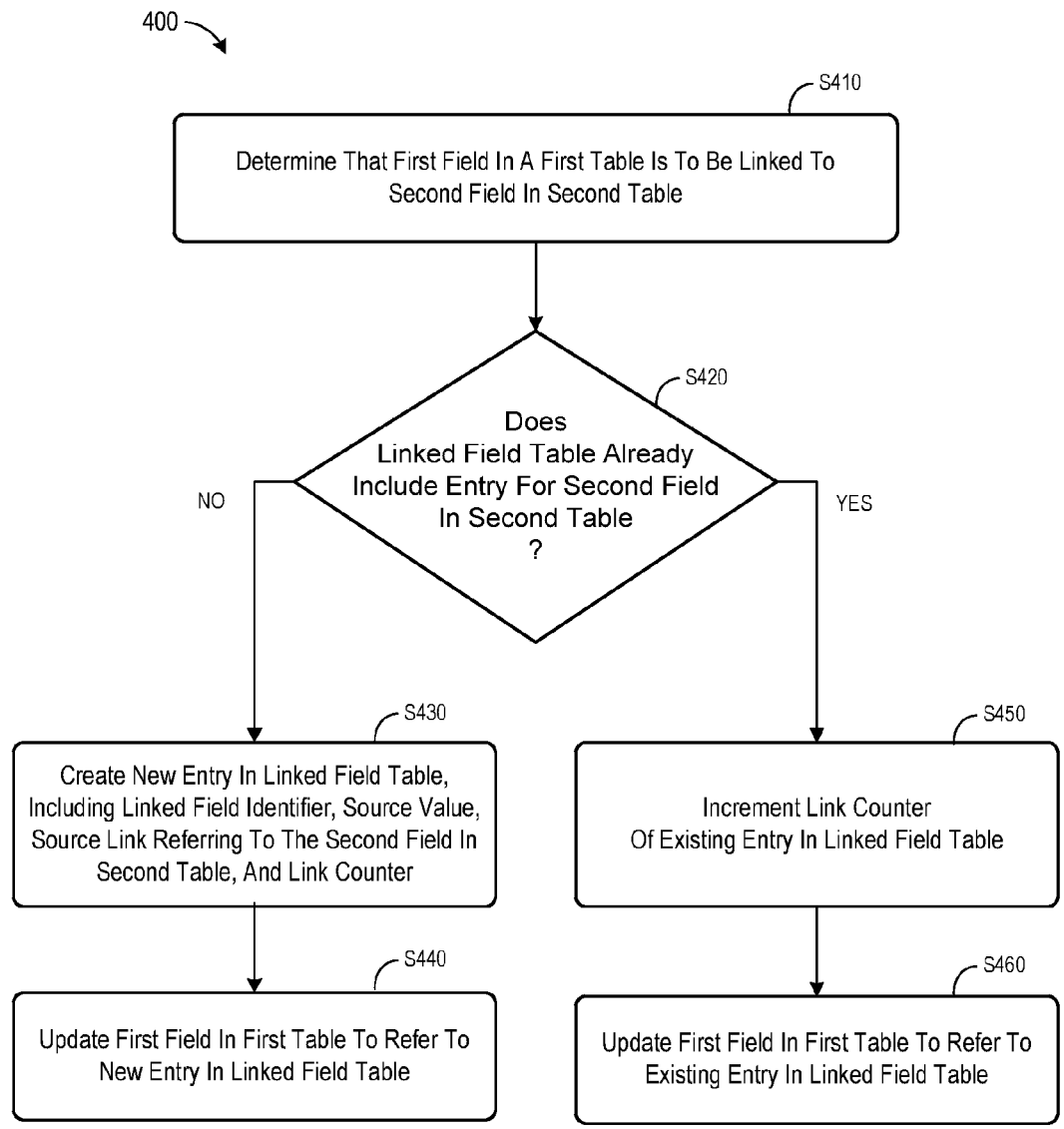
FIG. 4 is a flow diagram of a process in accordance with some embodiments.

FIG. 4 is a flow diagram of a process 400 that might be associated with the illustration 300 of FIG. 3 according to some embodiments. Note that all processes described herein may be executed by any combination of hardware and/or software. The processes may be embodied in program code stored on a tangible medium and executable by a computer to provide the functions described herein. Further note that the flow charts described herein do not imply a fixed order to the steps, and embodiments of the present invention may be practiced in any order that is practicable.

At S410, it may be determined that a first field in a first table is to be linked to a second field in a second table. According to some embodiments, the first table and second table are associated with the same table or database. According to other embodiments, the first table and second table are associated with different tables or databases. Moreover, at least one of the first table, second table, and linked field table might be associated with a plurality of remote database servers (e.g., in cloud computing environment). Further note that any of the embodiments described herein might be associated with nested links where one linked filed refers to another linked field.

At S420, it may be determined whether a linked field table already includes an entry associated with the second field in the second table. If the linked field table does not already include an entry associated with the second field in the second table, a new entry is created at S430 (e.g., by adding a new row to a hash table). In particular, the new entry is automatically created by a computer processor and includes a linked field identifier, a source value, a source link referring to the second field in the second table, and a link counter containing a value indicating that one field refers to the second field in the second table. For example, the link counter might be initialized to "1" to indicate that a single field current refers to the second field in the second table. At S440, the first field in the first table is updated to refer to the new entry in the linked field table.

Figure 5:
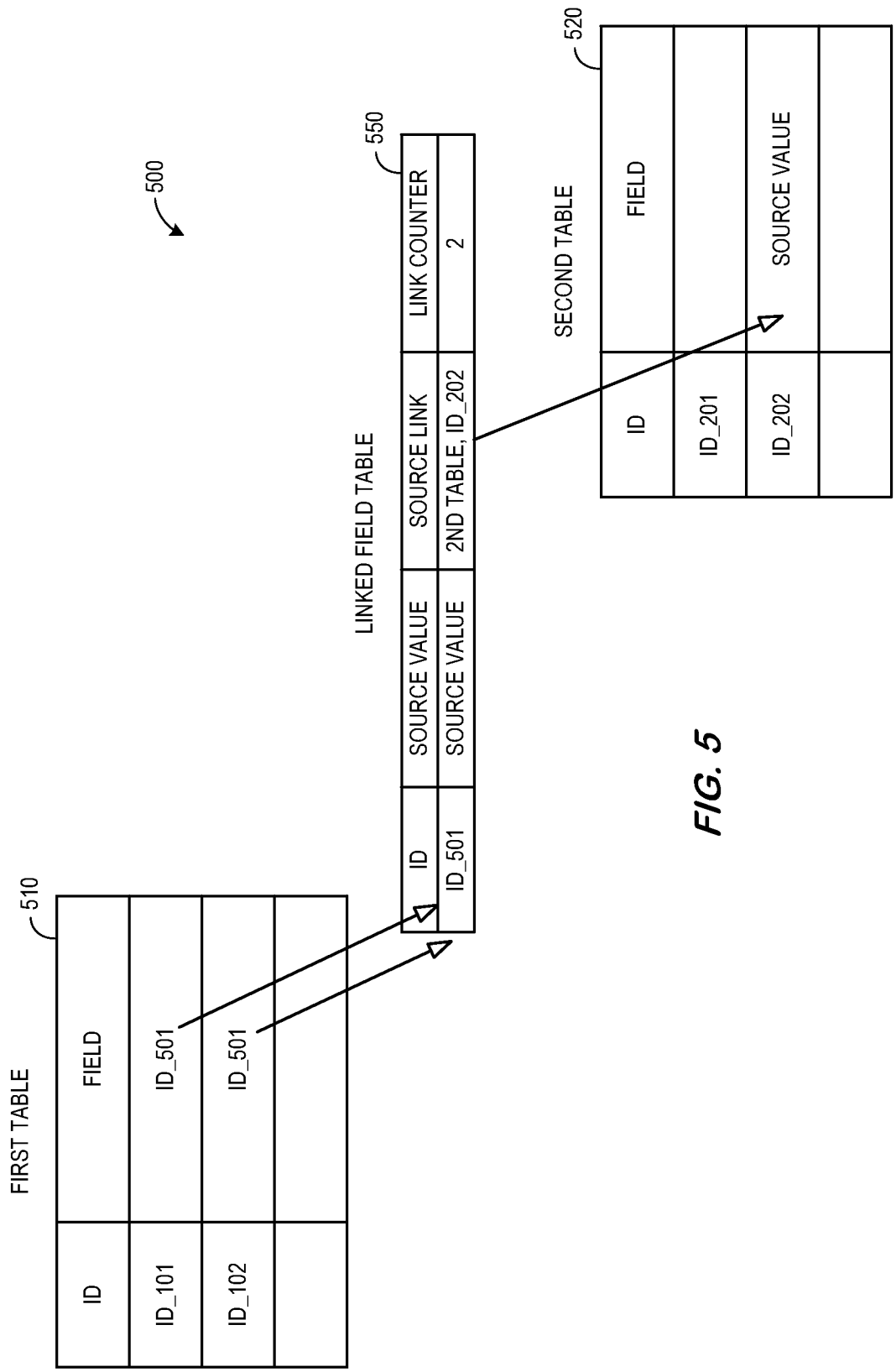
FIG. 5 illustrates support of an additional linked field that already exists in a linked field table in accordance with some embodiments.

If at S420 it was determined that the linked field table does already include an entry associated with the second field in the second table, no new entry is needed. Instead, the link counter of the existing entry is incremented at S450 (e.g., by adding "+1" to the current value). At S460, the first field in the first table is updated to refer to the existing entry in the linked field table. Consider, for example, FIG. 5 which is an illustration 500 wherein an additional linked field ("ID_102" in a first table 510) is linked to a source field ("ID_202" in a second table 52) that already exists in a linked field table 550 in accordance with some embodiments. Since the linked field table 550 already had entry "ID_501," the associated link counter is simply increased from "1" to "2" (reflecting that two linked fields now have "ID_202" in the second table 520 as a source field).

Figure 6:
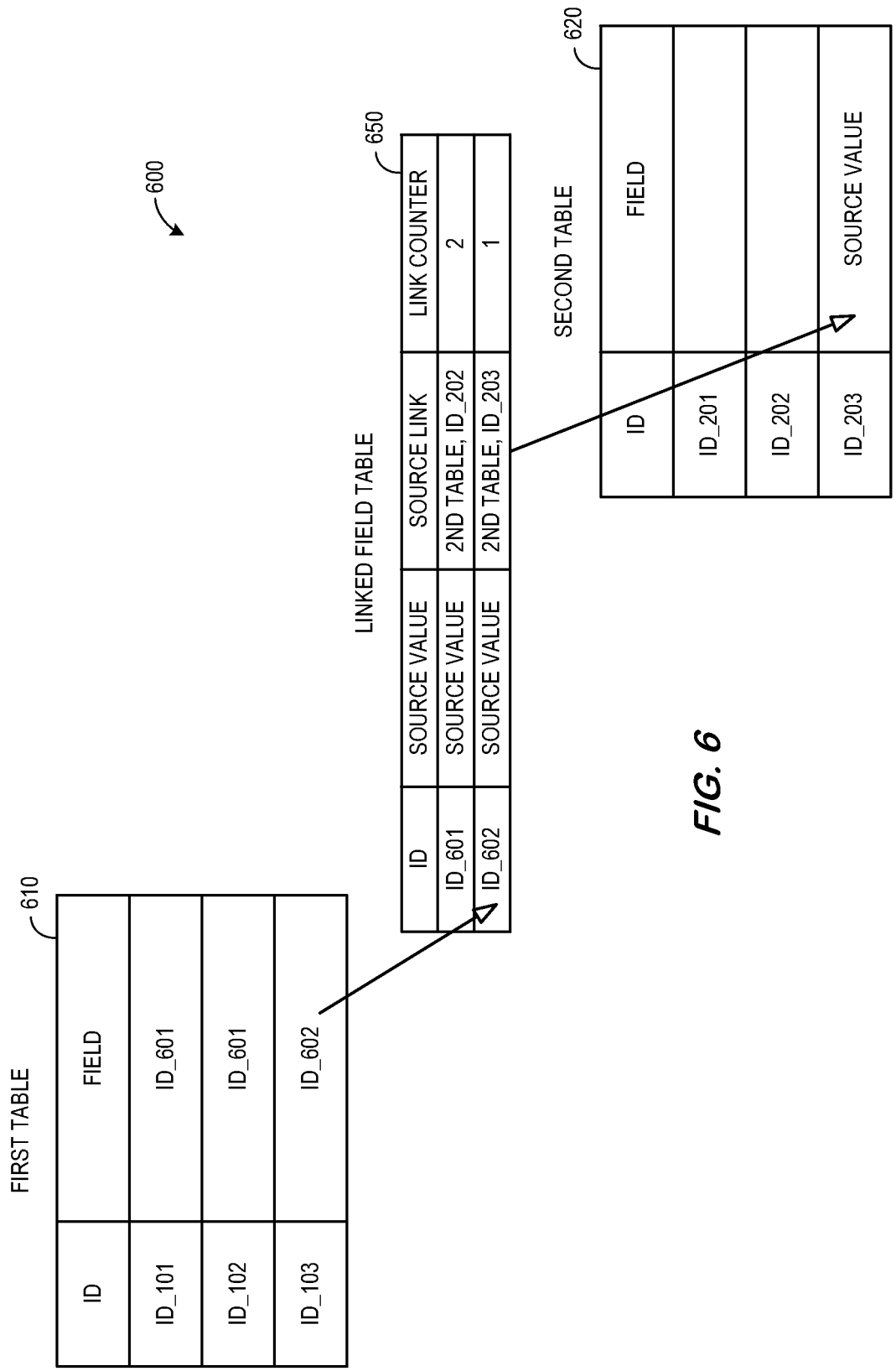
FIG. 6 illustrates an additional linked field that does not already exist in a linked field table in accordance with some embodiments.

If, on the other hand, there was no existing entry in the linked field table 550, then a new entry would be created. For example, FIG. 6 is an illustration 600 wherein an additional linked field ("ID_103" in a first table 610) is linked to a source field ("ID_203" in a second table 620) that did not already exist in a linked field table 650 in accordance with some embodiments. In particular, a new entry "ID_602" has been added with an associated link counter initialized to "1."

Figure 7:
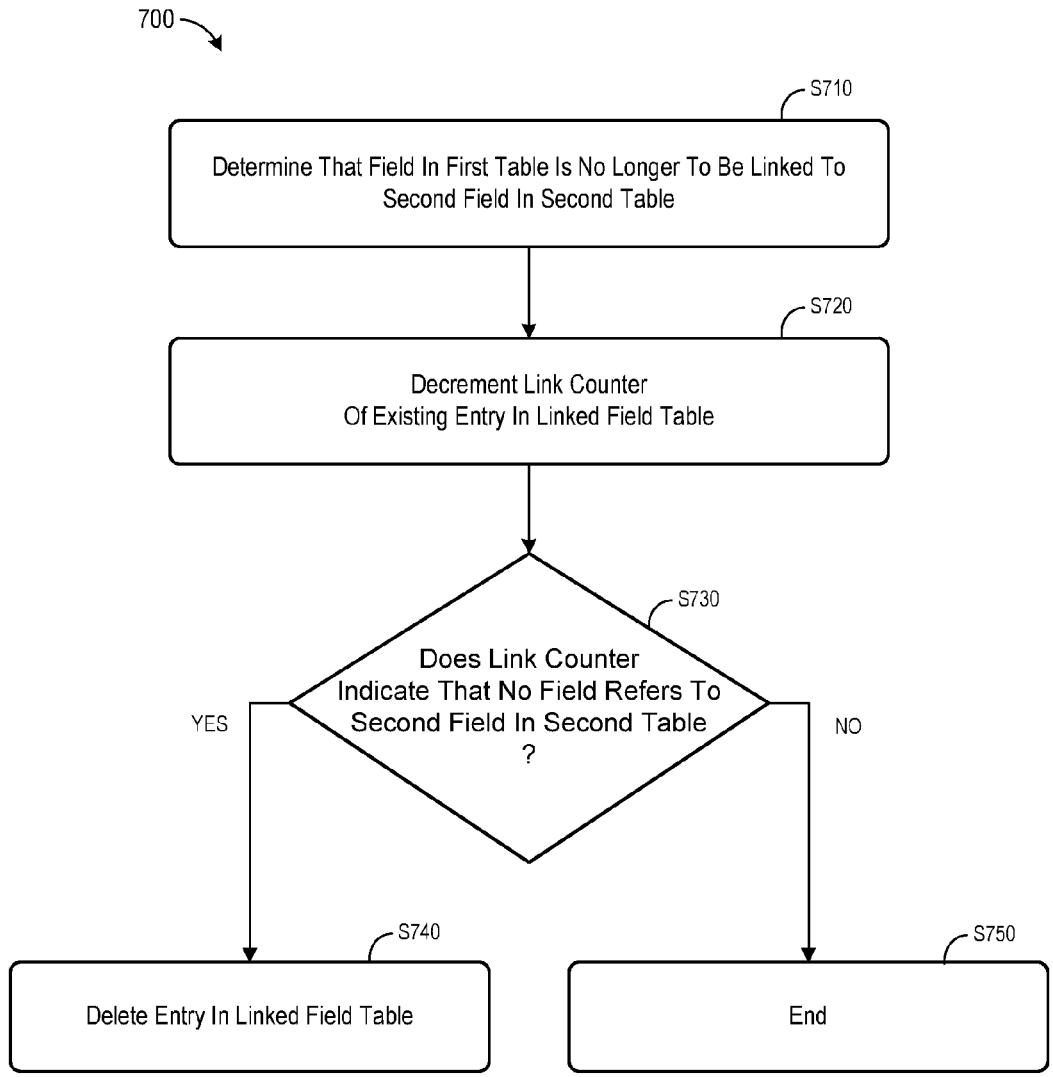
FIG. 7 is a flow diagram of a process associated with unlinking fields in accordance with some embodiments.
Figure 8:
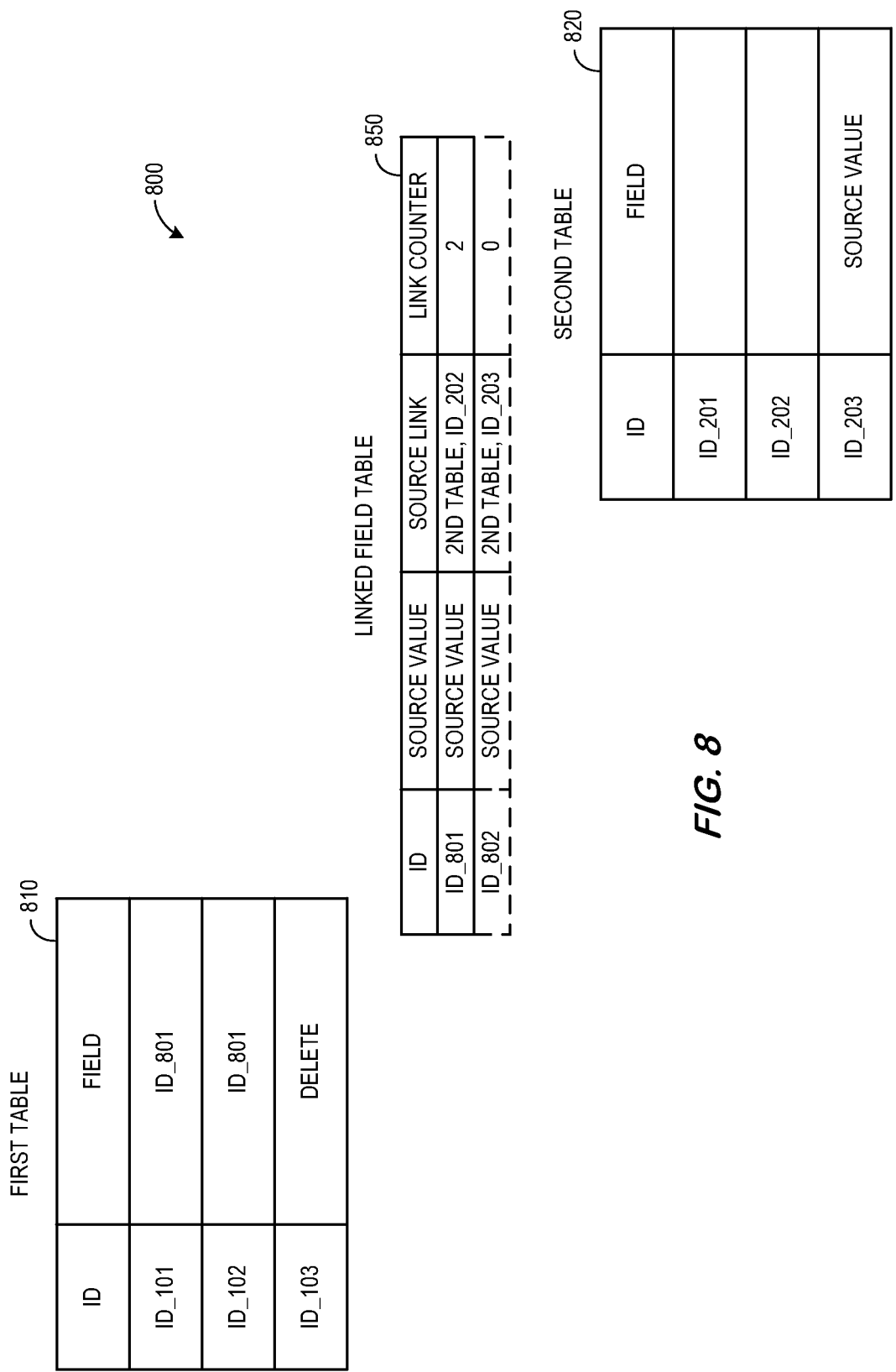
FIG. 8 illustrates a way of unlinking and/or deleting fields in tables in accordance with some embodiments.

In some cases, a linked field may be deleted or be otherwise unlinked with a source field. FIG. 7 is a flow diagram of a process 700 associated with unlinking fields in accordance with some embodiments. At S710, it is determined that a field is no longer to be linked to a second field in a second table. At S720, the link counter value of the associated entry in a linked field table is decremented (e.g., by subtracting "−1" from the value). At S730, it is determined whether the link counter value of the associated entry in the linked field table indicates that no field refers to the second field in the second table (e.g., by determining whether the value is now "0"). If no field refers to the second field in the second table, then the associated entry in the linked field table may be deleted at S740. Otherwise (that is, the link counter does not equal "0"), the process ends at S750. FIG. 8 is an illustration 800 of unlinking and/or deleting fields in tables in accordance with some embodiments. In particular, a field having an identifier of "ID_103" in a first table 810 is unlinked from a field having an identifier of a second table 820 (e.g., because ID_103 has been deleted). As a result, the link counter in the linked field table 850 was decremented from "1" to "0" and the entire entry in the linked field table 850 can be deleted (e.g., because no other field now is linked to that particular source field). According to some embodiments, if a source field is deleted, then the system will delete the corresponding row in the linked field table 850. If a linked field subsequently attempts to access that entry, only to find that the row is deleted, the linked field might also be removed.

In some cases, it may be determined that a name associated with the second table 820 has changed. In this case, the source link of the appropriate entries in the linked field database 850 may be updated to reflect the changed name of the second table 820 (that is, no changes may be needed in the first table 810). Note that only a single database query (e.g., an SQL query) might be need to determine whether or not a source field has any linked fields. This might be performed, for example, via an inner-join operation of a source field table and/or a hash table. As a result, the system may easily determine the corresponding row of a hash table for every source field. Similarly, when a linked field is selected, the system may obtain a corresponding source value by one SQL operation using an inner join on a hash table and the table including the linked field.

Accordingly, methods and mechanisms to efficiently, accurately, and/or automatically support linked fields in tables and/or databases may be provided in accordance with some embodiments described herein.

Figure 9:
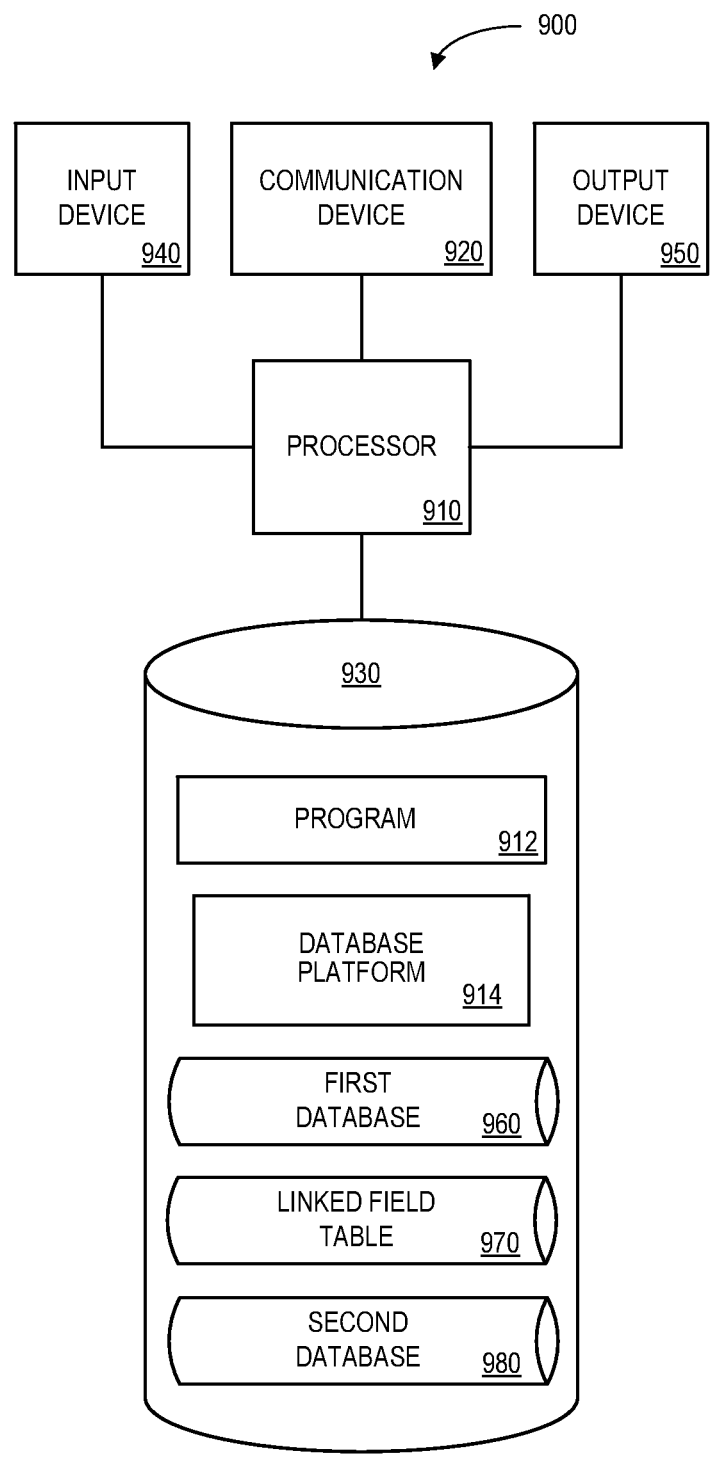
FIG. 9 is a block diagram of an apparatus according to some embodiments.

Note that the techniques described with respect to FIGS. 3 through 8 might be implemented using any of a number of different types of hardware. For example FIG. 9 is a block diagram overview of an apparatus 900 according to some embodiments. The apparatus 900 may be, for example, associated with a business server. The apparatus 900 comprises a processor 910, such as one or more commercially available Central Processing Units (CPUs) in the form of one-chip microprocessors, coupled to a communication device 920 configured to communicate via a communication network (not shown in FIG. 9). The communication device 920 may be used, for example, as an input path to receive information about links between fields. The apparatus 900 further includes an input device 940 (e.g., a mouse and/or keyboard to enter security requirements) and an output device 950 (e.g., a computer monitor to display business information reports).

The processor 910 communicates with a storage device 930. The storage device 930 may comprise any appropriate information storage device, including combinations of magnetic storage devices (e.g., a hard disk drive), optical storage devices, and/or semiconductor memory devices. The storage device 930 stores a program 912 and/or business data platform 914 for controlling the processor 910. The processor 910 performs instructions of the programs 912, 914, and thereby operates in accordance with any of the embodiments described herein. For example, the processor 910 may determine that a first field in a first table is to be linked to a second field in a second table. The processor 910 may then automatically create a new entry in a linked field table, the new entry including a linked field identifier, a source value, a source link referring to the second field in the second table, and a link counter containing a value indicating that one field refers to the second field in the second table. The first field in the first table may then be updated by the processor 910 to refer to the new entry in the linked field table.

The programs 912, 914 may be stored in a compressed, uncompiled and/or encrypted format. The programs 912, 914 may furthermore include other program elements, such as an operating system, a database management system, and/or device drivers used by the processor 910 to interface with peripheral devices. As illustrated in FIG. 9, the storage device 930 might also contain a first database 960, a linked field table 970, and/or a second database 980 (e.g., containing source fields).

As used herein, information may be "received" by or "transmitted" to, for example: (i) the apparatus 900 from another device; or (ii) a software application or module within the apparatus 900 from another software application, module, or any other source.

Thus, some embodiments may establish methods and mechanisms to efficiently, accurately, and/or automatically support linked fields in tables and/or databases. Moreover, according to some embodiments, an entry in a linked field table may further include an aggregate field associated with a pre-determined function. For example, aggregations and/or calculations may be efficiently supported in a database. An aggregation and/or calculation might be, for example, defined on linked fields to perform a pre-defined function (and the result may be stored in connection with the aggregated field). To improve performance, the system may re-calculate the aggregated field upon any update on the linked fields or the source field (thus, a reference to the aggregated field may be stored such that it can be accessed easily). For example, when there is only a single aggregate field, the system might only add a new column to the hash table to save the appropriate link to the aggregated field. In addition, upon any update on either source or linked fields, the system may access the aggregated field to re-calculate the appropriate value. If there are multiple aggregated fields associated with the same source/linked fields, the system may define an aggregate table for the aggregated fields in accordance with any of the embodiments described herein.

The following illustrates various additional embodiments and do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although embodiments have been described with respect to business systems and databases, note that embodiments may be associated with other types of enterprise data. For example, financial, governmental, educational, and/or medical information may be processed in accordance with any of the embodiments described herein.

Moreover, while embodiments have been illustrated using particular types of tables and databases, embodiments may be implemented in any other of a number of different ways. For example, some embodiments might be associated with links between fields in a single table or database.

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A computer implemented method facilitating database field linking, comprising:
  determining that a first field in a first table is to be linked to a second field in a second table;
  automatically creating by a computer processor a new entry in a linked field table, the new entry including a linked field identifier, a source value, a source link referring to the second field in the second table, and a link counter containing a value indicating a current number of fields that refer to the second field in the second table wherein the link counter is incremented as the number of fields that refer to the second field increases and the link counter is decremented as the number of fields that refer to the second field decreases; and
  updating the first field in the first table to refer to the new entry in the linked field table.

2. The method of claim 1, wherein the new entry in the linked field table comprises a new row in a hash table.

3. The method of claim 1, further comprising:
  determining that an additional field is to be linked to the second field in the second table;
  incrementing the link counter value of the new entry; and
  updating the additional field to refer to the new entry in the linked field table.

4. The method of claim 3, further comprising:
  determining that a field is no longer to be linked to the second field in the second table; and decrementing the link counter value of the new entry in the linked field table.

5. The method of claim 4, further comprising:
determining that the link counter value of the new entry in the linked field table indicates that no field refers to the second field in the second table; and
deleting the new entry in the linked field table.

6. The method of claim 1, wherein the first table and second table are associated with the same database.

7. The method of claim 1, wherein the first table and second table are associated with the different databases.

8. The method of claim 1, wherein at least one of the first table, second table, and linked field table are associated with a plurality of remote database servers.

9. The method of claim 1, further comprising:
determining that a name associated with the second table has changed; and
updating the source link of the new entry to reflect the changed name of the second table.

10. The method of claim 1, wherein the new entry in the linked field table further includes an aggregate field associated with a pre-determined function.

11. A non-transitory, computer-readable medium storing program code executable by a computer processor to perform a method facilitating database field linking, the method comprising:
determining that a first field in a first database is to be linked to a second field in a second database;
automatically creating by a computer processor a new entry in a linked field table, the new entry including a linked field identifier, a source value, a source link referring to the second field in the second database, and a link counter containing a value indicating a current number of fields that refer to the second field in the second database, wherein the link counter is incremented as the number of fields that refer to the second field increases and the link counter is decremented as the number of fields that refer to the second field decreases; and
updating the first field in the first database to refer to the new entry in the linked field table.

12. The medium of claim 11, wherein the new entry in the linked field table comprises a new row in a hash table.

13. The medium of claim 11, further comprising:
determining that an additional field is to be linked to the second field in the second database;
incrementing the link counter value of the new entry; and
updating the additional field to refer to the new entry in the linked field table.

14. The medium of claim 13, further comprising:
determining that a field is no longer to be linked to the second field in the second database; and
decrementing the link counter value of the new entry in the linked field table.

15. The medium of claim 14, further comprising:
determining that the link counter value of the new entry in the linked field table indicates that no field refers to the second field in the second database; and
deleting the new entry in the linked field table.

16. The medium of claim 11, further comprising:
determining that a name associated with the second database has changed; and
updating the source link of the new entry to reflect the changed name of the second database.

17. A system, comprising:
a storage unit storing a first table, a second table, and a linked field table; and
a computer processor, coupled to said storage unit, to: (i) determine that a first field in the first table is to be linked to a second field in the second table, (ii) automatically create a new entry in the linked field table, the new entry including a linked field identifier, a source value, a source link referring to the second field in the second table, and a link counter containing a value indicating a current number of fields that refer to the second field in the second table wherein the link counter is incremented as the number of fields that refer to the second field increases and the link counter is decremented as the number of fields that refer to the second field decreases, and (iii) update the first field in the first table to refer to the new entry in the linked field table.

18. The system of claim 17, wherein the computer processor is further to: (iv) determine that an additional field is to be linked to the second field in the second table, (v) increment the link counter value of the new entry, and (vi) update the additional field to refer to the new entry in the linked field table.

19. The system of claim 18, wherein the computer processor is further to: (vii) determine that a field is no longer to be linked to the second field in the second table, and (viii) decrement the link counter value of the new entry in the linked field table.

20. The system of claim 19, wherein the computer processor is further to: (ix) determine that the link counter value of the new entry in the linked field table indicates that no field refers to the second field in the second table, and (x) delete the new entry in the linked field table.

21. The system of claim 20, wherein the computer processor is further to: (xi) determine that a name associated with the second table has changed, and (xii) update the source link of the new entry to reflect the changed name of the second table.

* * * * *